United States Patent
Pandey et al.

(10) Patent No.: US 9,106,873 B2
(45) Date of Patent: Aug. 11, 2015

(54) METHODS AND SYSTEMS FOR PROVIDING ENHANCED CONTENT BY WAY OF A VIRTUAL CHANNEL

(75) Inventors: Siddharth Pandey, Irving, TX (US); Brian F. Roberts, Dallas, TX (US); Enrique Ruiz-Velasco, Flower Mound, TX (US); Raul I. Aldrey, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 688 days.

(21) Appl. No.: 12/752,504

(22) Filed: Apr. 1, 2010

(65) Prior Publication Data

US 2011/0247037 A1 Oct. 6, 2011

(51) Int. Cl.
  H04N 21/4722 (2011.01)
  H04N 21/81 (2011.01)
  H04N 21/462 (2011.01)
  H04N 5/445 (2011.01)
  H04N 21/2668 (2011.01)
  H04N 21/431 (2011.01)
  H04N 21/482 (2011.01)
  H04N 21/472 (2011.01)
  H04N 21/478 (2011.01)

(52) U.S. Cl.
  CPC ....... *H04N 5/44543* (2013.01); *H04N 21/2668* (2013.01); *H04N 21/4314* (2013.01); *H04N 21/4622* (2013.01); *H04N 21/472* (2013.01); *H04N 21/4722* (2013.01); *H04N 21/4826* (2013.01); *H04N 21/812* (2013.01); *H04N 21/8126* (2013.01); *H04N 21/478* (2013.01)

(58) Field of Classification Search
  CPC ............ H04N 21/812; H04N 21/4722; H04N 21/8162; H04N 21/4622; H04N 21/478; G06Q 30/02; G06Q 30/0277
  USPC ............. 725/9, 13, 16, 32, 34–42, 47–49, 51, 725/61, 105, 109, 110, 112, 113, 43, 725/120–122; 348/563–565, 569
  See application file for complete search history.

(56) References Cited

U.S. PATENT DOCUMENTS

| | | | | |
|---|---|---|---|---|
| 6,469,753 | B1 * | 10/2002 | Klosterman et al. | 348/552 |
| 2002/0184624 | A1 * | 12/2002 | Spencer | 725/39 |
| 2003/0028873 | A1 * | 2/2003 | Lemmons | 725/36 |
| 2005/0027608 | A1 * | 2/2005 | Wiesmuller et al. | 705/26 |
| 2005/0076092 | A1 * | 4/2005 | Chang et al. | 709/217 |
| 2007/0112630 | A1 * | 5/2007 | Lau et al. | 705/14 |
| 2008/0022300 | A1 * | 1/2008 | Angiolillo et al. | 725/32 |
| 2008/0244671 | A1 * | 10/2008 | Moon et al. | 725/110 |
| 2009/0158311 | A1 * | 6/2009 | Hon et al. | 725/14 |
| 2010/0138561 | A1 * | 6/2010 | Church | 709/248 |

\* cited by examiner

*Primary Examiner* — Benjamin R Bruckart
*Assistant Examiner* — Jason Thomas

(57) ABSTRACT

Exemplary methods and systems for providing enhanced content by way of a virtual channel are disclosed herein. An exemplary method includes a service provider subsystem providing a virtual channel, associating the virtual channel with a content provider, receiving enhanced content to be provided by way of the virtual channel from the content provider, associating one or more selectable triggers with the virtual channel, and providing a user with access to the enhanced content in response to a selection by the user of one of the one or more selectable triggers. Corresponding methods and systems are also disclosed.

19 Claims, 16 Drawing Sheets

TARZAN
Interactive Portal

- Trailers and Clips
- Related Movies
- Chat Room
- Cast and Crew
- Shop
- Send to a Friend
- Follow us

Steve
I am looking forward to this. Check out the interview with Jane in the clips section.
-Monday, 12/7, 9:48AM

Bonnie
I love monkeys!
-Tuesday, 12/8, 11:02AM

Karl
Anyone want to come over to my house to watch this movie with me?
-Tuesday, 12/8, 1:29PM

[ Leave a Comment ]    [ Next Page ]

Fig. 11

METHODS AND SYSTEMS FOR PROVIDING ENHANCED CONTENT BY WAY OF A VIRTUAL CHANNEL

BACKGROUND INFORMATION

As media content distribution and processing technologies have advanced, media outlets through which advertisements are distributed have increased both in number and type. The increased number and type of media outlets have provided a variety of platforms that may be used by advertisers to distribute advertisement content to potential consumers. For example, set-top box devices and other media content access devices are often capable of receiving and/or delivering advertisement content to users. The delivered advertisement content may be associated with one of a variety of products for sale. For example, an advertisement may promote a media content instance, such as a pay-per-view event, a video-on-demand program, a movie, music, and/or any other type of media content instance that is available for purchase.

However, it is sometimes difficult to generate user interest in an advertised product through traditional advertisements. This is due at least in part to various limitations associated with traditional advertisements. For example, traditional broadcast advertisements are limited to a relatively short amount of time to generate user interest in a product being advertised. Hence, alternative approaches to promoting and incentivizing the purchase of advertised products are desirable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

FIG. 11 illustrates an exemplary interactive portal according to principles described herein.

DETAILED DESCRIPTION OF PREFERRED EMBODIMENTS

Figure 1:
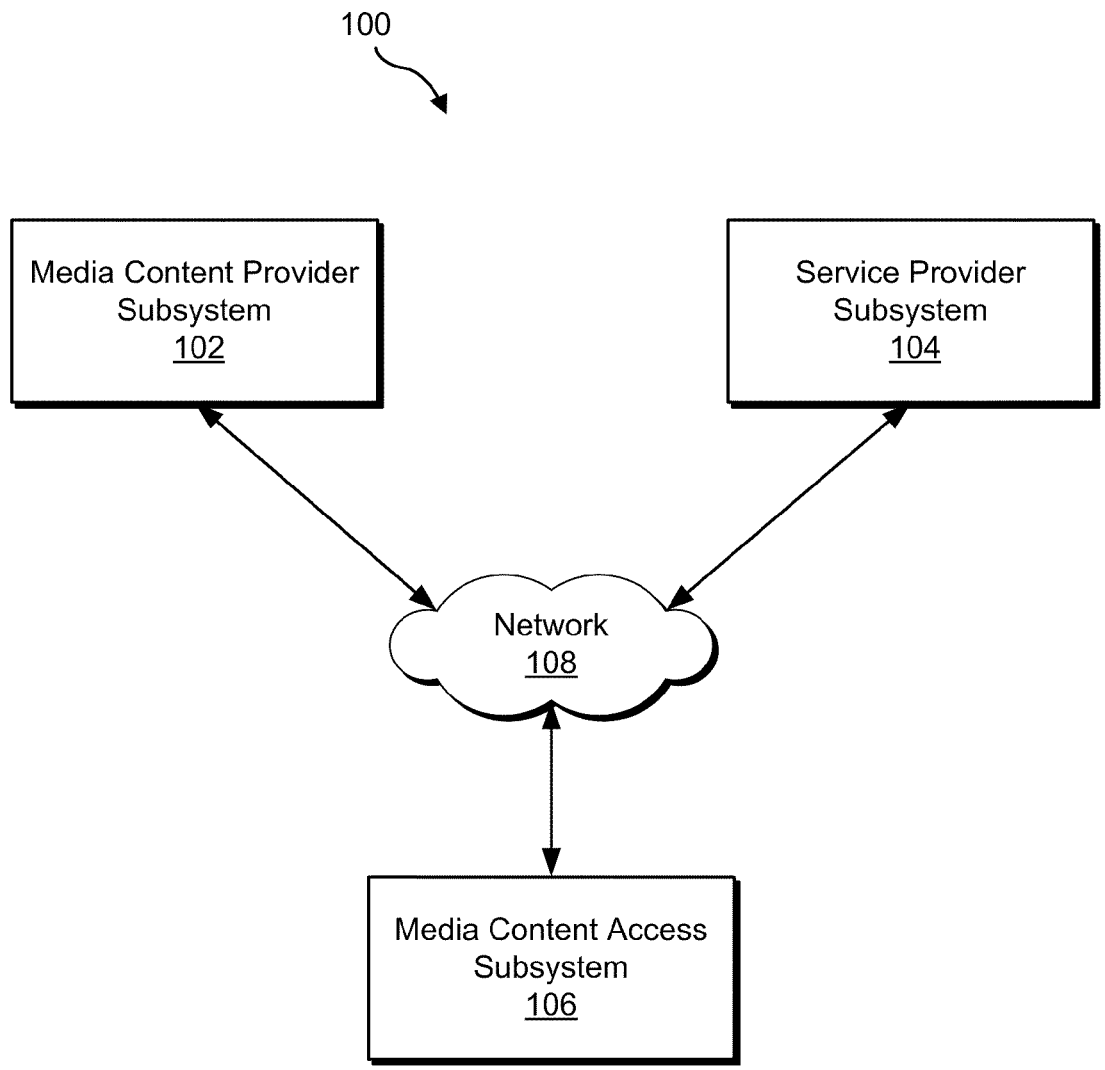
FIG. 1 illustrates an exemplary system for providing enhanced content by way of virtual channels according to principles described herein.

Exemplary methods and systems for providing enhanced content by way of a virtual channel are described herein. As described further below, one or more of the exemplary systems and/or methods disclosed herein may enable a vendor to engage potential consumers and generate consumer interest in a promoted product with increased effectiveness through the use of virtual channels and enhanced content. Additionally, one or more of the exemplary systems and/or methods disclosed herein may allow interactive content associated with a promoted product to be selectively launched or otherwise accessed by potential customers (e.g., users of media content access devices), thus providing the potential customers with the ability to explore content associated with the promoted product at their leisure.

In some examples, a service provider subsystem may be configured to provide a virtual channel and associate the virtual channel with a content provider (e.g., a vendor, advertiser, etc.). The service provider subsystem may receive enhanced content from the content provider to be provided by way of the virtual channel. The service provider subsystem may also associate one or more selectable triggers with the virtual channel. In response to a selection by a user of one of the one or more selectable triggers, the service provider subsystem may provide the user with access to the enhanced content by way of the virtual channel. By providing enhanced content accessible by way of a virtual channel, a vendor may avoid customary limitations associated with traditional advertisements and generate greater interest in a promoted product more efficiently and in a more cost effective manner.

As used herein, a "promoted product" (also referred to herein as an "advertised product" or simply a "product") may refer to any media content instance, good, service, information, campaign, or other tangible or intangible product being promoted and/or advertised. For example, a promoted product may include a movie available in theatres and/or on-demand, an automobile, a political campaign, and/or any other product as may serve a particular implementation.

As used herein, an "advertisement" may include any information and/or media content configured to generate user interest in a product. Exemplary advertisements may include, without limitation, linear advertisements, on-demand advertisements (e.g., video-on-demand ("VOD") advertisements), interactive advertisements, banner advertisements, application insertion advertisements, and content portal advertisements. Linear advertisements may include traditional commercials (e.g., thirty-second spots) presented during a media content broadcast. On-demand advertisements may include advertisements housed within an on-demand system (e.g., one or more on-demand content servers), such as VOD ads housed within one or more VOD servers. Interactive advertisements may include any advertisements with which a user may interact. Banner advertisements may include any advertisements that may be spatially placed within a display view provided to a user. Banner advertisements may include static and/or clickable banner ads. Application insertion advertisements may include advertisements that may be inserted within an application such as a video game application provided by a media outlet. The advertisement types described above are illustrative only. Other advertisement types and/or combinations of advertisement types may be used in other embodiments.

As used herein, "media content" may refer generally to any content accessible via an access subsystem. The term "media content instance" will be used herein to refer to any television program, on-demand media program (e.g., video-on-demand program), pay-per-view event, broadcast media program (e.g., broadcast television program), multicast media program, narrowcast media program, advertisement, IPTV media content, video, movie, song, video game, text, images, or combination of these or other forms of media content that may be viewed or otherwise experienced by a user.

As used herein, a "virtual channel" refers to any interactive channel by which enhanced content associated with a promoted product may be presented to a user of a media content access subsystem. In some examples, a virtual channel may be implemented by an Internet-Protocol ("IP") channel associated with a television subscription service.

As used herein, "enhanced content" refers to any content configured to generate user interest in a promoted product. For example, enhanced content may include, but is not limited to, interactive content associated with the promoted product, social networking content associated with the promoted product, Internet-based content associated with the promoted product, content associated with personnel associated with the promoted product, rating/review content associated with the promoted product, activities associated with the promoted product, one or more advertisements for the promoted product or any related products, content associated with dealers/retailers of the promoted product, and/or any other content associated with the promoted product that may be accessed by a user. Specific examples of enhanced content will be described in more detail below.

FIG. 1 illustrates an exemplary system 100 for providing enhanced content by way of virtual channels. As will be described in more detail below, system 100 may be configured to facilitate access by a user to enhanced content associated with a promoted product by way of a virtual channel. System 100 may include, but is not limited to a media content provider subsystem 102, a service provider subsystem 104, and a media content access subsystem 106 (or simply "access subsystem 106").

Media content provider subsystem 102 may be configured to manage (e.g., maintain, process, distribute, and/or generate) media content (e.g., media content programs, advertisements, etc.) configured to be presented to one or more users of access subsystem 106. For example, media content provider subsystem 102 may be configured to facilitate creation of advertisement content related to a promoted product. To illustrate, a vendor may utilize media content provider subsystem 102 to create one or more advertisements associated with the promoted product. The advertisements may include information and/or media content instances promoting the product as well as one or more selectable triggers for accessing the virtual channel. As will be described in more detail below, a user may select one of the one or more selectable triggers to access enhanced content associated with the promoted product.

Media content provider subsystem 102 may be further configured to generate, maintain, and/or provide enhanced content to be presented to a user of access subsystem 106 by way of a virtual channel. For example, media content provider subsystem 102 may be associated with a vendor desiring to promote a particular product. The vendor may utilize media content provider subsystem 102 to create enhanced content configured to generate user interest in the product. The enhanced content may then be presented to one or more users by way of a virtual channel in accordance with principles described herein.

Service provider subsystem 104 may be configured to provide one or more services configured to facilitate delivery of media content, enhanced content, and/or any other data to access subsystem 106. For example, service provider subsystem 104 may be configured to provide a virtual channel and associate the virtual channel with a content provider (e.g., a vendor or an advertiser). As will be described in more detail below, service provider subsystem 104 may receive enhanced content from the content provider (e.g., using media content provider subsystem 102) to be provided by way of the virtual channel, associate one or more selectable triggers with the virtual channel, and provide a user with access to the enhanced content in response to a selection by the user of one of the one or more selectable triggers.

Access subsystem 106 may be configured to facilitate access by a user to media content (e.g., advertisements, media content instances), enhanced content, and/or other data provided by media content provider subsystem 102 and/or service provider subsystem 104. To this end, access subsystem 106 may be communicatively coupled to media content provider subsystem 102 by way of the services provided by service provider subsystem 104.

Components of system 100 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Components of system 100 may communicate using any suitable network. For example, as shown in FIG. 1, components of system 100 may be configured to communicate with each other over a network 108. Network 108 may include one or more networks or types of networks capable of carrying communications and/or data signals between the components of system 100. For example, network 108 may include, but are not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network (e.g., a Verizon® FIOS® network), the Internet, an intranet, local area network, any other suitable network, and/or any combination or sub-combination of these networks.

In some examples, although FIG. 1 shows components of system 100 communicatively coupled via network 108, it will be recognized that the components of system 100 may be configured to communicate one with another in any other suitable manner (e.g., via a direct connection).

While an exemplary system 100 is shown in FIG. 1, the exemplary components illustrated in FIG. 1 are not intended to be limiting. Other hardware environments and implementations may be used in other implementations. Exemplary components of system 100 will now be described in additional detail.

Figure 2:
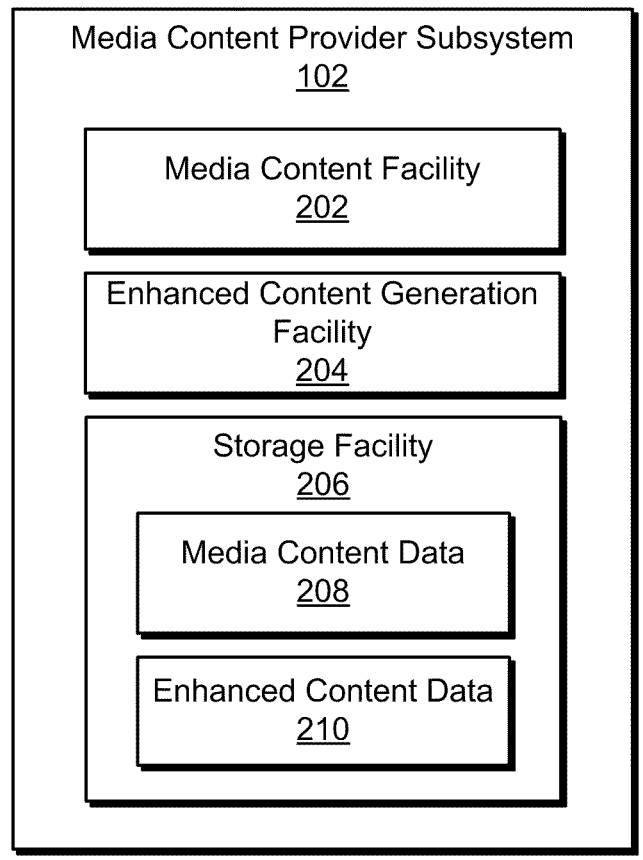
FIG. 2 illustrates an exemplary media content provider subsystem according to principles described herein.

FIG. 2 illustrates exemplary components of media content provider subsystem 102. As shown, media content provider subsystem 102 may include a media content facility 202, an enhanced content generation facility 204, and a storage facility 206, which may be in communication with one another using any suitable communication technologies.

Media content facility 202 may be configured to manage (e.g., maintain, process, distribute, and/or generate) media content configured to be presented to one or more users of access subsystem 106. For example media content facility 202 may be configured to create and/or deliver advertisements configured to generate user interest in a promoted product. In some examples, the advertisements may include and/or be associated with one or more selectable triggers configured to facilitate access by a user to enhanced content associated with the promoted product.

To illustrate, a vendor may utilize media content facility 202 to generate a television advertisement configured to promote a particular product. At the end of the television advertisement, the vendor may include instructions for the user to select a trigger (e.g., by pressing one or more input keys on a user input device) in order to access enhanced content related to the promoted product. After following the instructions, the user may be provided access to the virtual channel and experience enhanced content related to the promoted product.

Enhanced content generation facility 204 may be configured to generate, maintain, and/or provide enhanced content to be presented to a user by way of a virtual channel. The enhanced content may include any of the exemplary enhanced content disclosed herein and may be configured to generate user interest in a promoted product. The enhanced content may be generated, maintained, and/or provided in any suitable manner.

Storage facility 206 may be configured to maintain media content data 208 representative of one or more media content instances and enhanced content data 210 representative of enhanced content. It will be recognized that storage facility 206 may maintain additional or alternative data as may serve a particular implementation.

Figure 3:
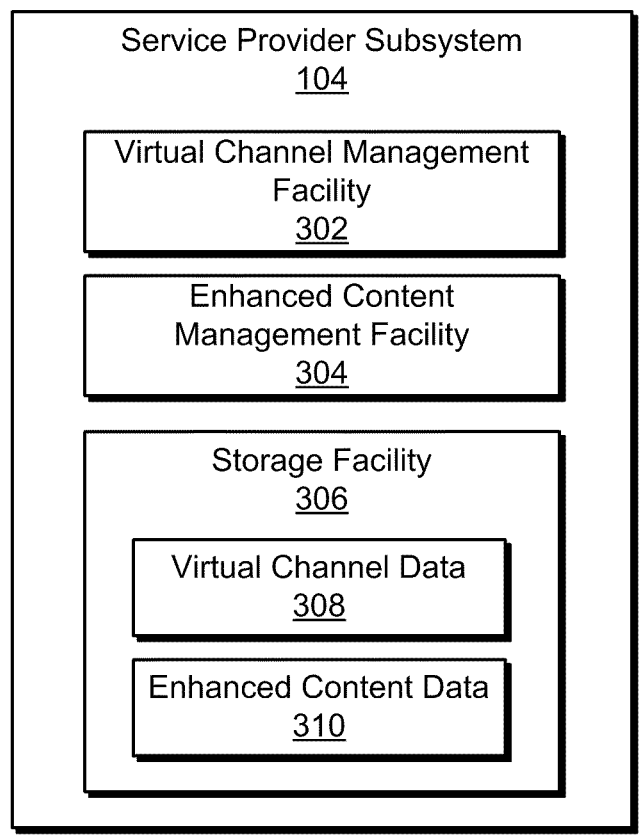
FIG. 3 illustrates an exemplary service provider subsystem according to principles described herein.

FIG. 3 illustrates exemplary components of service provider subsystem 104. As shown, service provider subsystem 104 may include a virtual channel management facility 302, an enhanced content management facility 304, and a storage facility 306, which may be in communication with one another using any suitable communication technologies.

Virtual channel management facility 302 may be configured to manage (e.g., create, maintain, and/or provide access to) one or more virtual channels. For example, virtual channel management facility 302 may be configured to provide one or more virtual channels and associate the one or more virtual channels with one or more content providers (e.g., vendors). To illustrate, service provider subsystem 104 may be associated with a service provider (e.g., a television subscription service provider) that has entered into a lease agreement to lease a virtual channel to a vendor. In this manner, the vendor may provide enhanced content associated with a product that the vendor is promoting by way of the virtual channel. The lease may be for a predetermined period of time, after which virtual channel management facility 302 may associate the virtual channel with another vendor.

Virtual channel management facility 302 may be further configured to selectively provide a user with access to a virtual channel. To this end, virtual channel management facility 302 may be configured to associate one or more selectable triggers with a virtual channel. In response to a selection by a user of a selectable trigger, virtual channel management facility 302 may provide the user with access to the virtual channel, as will be described in more detail below.

Enhanced content management facility 304 may be configured to receive, from a content provider, enhanced content to be provided to a user by way of a virtual channel associated with the content provider. The enhanced content may be received from the content provider in any suitable manner. For example, the enhanced content may be received from media content provider subsystem 102.

The enhanced content received by enhanced content management facility 304 may include any of the enhanced content described herein. For example, the enhanced content may include social networking content (e.g., chat rooms, message boards, and/or links to social networking websites such as Facebook, Twitter, etc.) that are associated with a promoted product, Internet-based content (e.g., hyperlinks to online news, blogs, and/or any other Internet-based content associated with the promoted product), interactive image content associated with the promoted product (e.g., slide shows, panoramic views, magnified views, 360° views, and/or any other images representing the promoted product), rating content associated with the promoted product (e.g., user ratings of the promoted product, features configured to receive user feedback regarding the promoted product that may then be provided to the content provider and/or other users, critics' ratings, safety ratings, Consumer Reports ratings, and/or any other ratings associated with the promoted product), interactive activities associated with the promoted product (e.g., games, puzzles, and/or any other activities associated with the promoted product), news and reviews of the promoted product, local content (e.g., links to local retailers, local events, local news, and/or other local content associated with the promoted product), and/or any other type of content associated with the promoted product as may serve a particular implementation.

In some examples, the enhanced content may facilitate the purchase of the promoted product and/or one or more objects associated with the promoted product. For example, various options to purchase the promoted product or objects associated with the promoted product (e.g., souvenirs, clothing, etc.) may be presented to a user as enhanced content.

If the promoted product includes a media content instance, the enhanced content may additionally or alternatively include content associated with personnel associated with the media content instance (e.g., bios, interviews, and/or chats with actors, directors, producers, and/or any other personnel associated with the media content instance), listings of other media content instances (e.g., movies, video clips, trailers) associated with the media content instance, one or more scenes included within or otherwise associated with the media content instance (e.g., exclusive trailers, still shots, and/or other scenes included within the media content instance), alternative or deleted scenes associated with the media content instance, production content associated with the media content instance (e.g., the enhanced content may provide a user with the ability to view or otherwise access exclusive footage from the production of the media content instance and/or to track how the production of the media content instance is progressing), one or more platform-specific formats of the media content instance (e.g., alternative resolution versions of the media content instance suitable for different types of access devices), information associated with the media content instance (e.g., show times and ticket information), and/or any other suitable enhanced content associated with the media content instance.

The aforementioned examples of enhanced content are merely illustrative of the many different types of enhanced content that may be associated with a promoted product. It will be recognized that additional or alternative types of enhanced content may be received by enhanced content management facility 304.

In some examples, enhanced content management facility 304 may be configured facilitate interaction by a user with enhanced content by providing an interactive portal. The interactive portal may be displayed by a display device associated with access subsystem 106 (e.g., on a display screen of a television, on a display screen of a mobile phone device, and/or on any other display screen as may serve a particular application) and may be configured to present enhanced content to the user in a manner specified by the content provider and/or service provider subsystem 104.

Enhanced content management facility 304 may be configured to provide one or more application programming interfaces ("APIs") configured to facilitate customization of the interactive portal to a content provider associated with the promoted product and/or the enhanced content. The content provider may utilize the APIs to provide input configured to customize the interactive portal. For example, the content provider may select the enhanced content to be included within the interactive portal, modify an appearance of the enhanced content within the interactive portal, and/or otherwise customize the interactive portal as may serve a particular application. In this manner, the content provider does not have to rely on personnel associated with the service provider subsystem 104 to perform updates to the enhanced content available within the interactive portal.

In some examples, the interactive portal may have a fixed layout consistent with a plurality of other interactive portals associated with other virtual channels. In this manner, although content providers may customize the enhanced content included within an interactive portal, each interactive portal with which a user interacts may have a consistent look and feel.

Enhanced content management facility 304 may additionally or alternatively be configured to automatically customize enhanced content available by way of a virtual channel. For example, enhanced content management facility 304 may automatically select enhanced content presented by way of the virtual channel, automatically modify an appearance of the enhanced content within an interactive portal, and/or otherwise automatically customize the enhanced content in accordance with the associated promoted product, a user profile associated with a user, and/or any other factor as may serve a particular application.

Storage facility 306 may be configured to maintain virtual channel data 308 used by virtual channel management facility 302 to manage one or more virtual channels and enhanced content data 310 representative of enhanced content. It will be recognized that storage facility 306 may maintain additional or alternative data as may serve a particular implementation.

Figure 4:
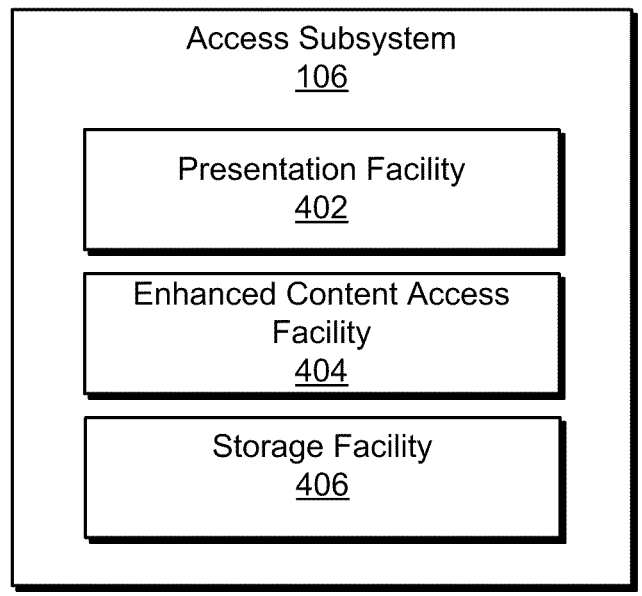
FIG. 4 illustrates an exemplary media content access subsystem according to principles described herein.

FIG. 4 illustrates exemplary components of access subsystem 106. As shown, access subsystem 106 may include a presentation facility 402, an enhanced content access facility 404, and a storage facility 406, which may be in communication with one another using any suitable communication technologies.

Presentation facility 402 may be configured to present media content and/or enhanced content for experiencing by a user. A presentation of media content (e.g., an advertisement) may be performed in any suitable way such as by generating and/or providing output signals representative of the media content and/or enhanced content to a display device (e.g., a television) and/or an audio output device.

To illustrate, presentation facility 402 may be configured to present an advertisement for a promoted product. The advertisement may be included within a broadcast advertisement stream that is presented to the user. The advertisement may include and/or present one or more selectable triggers thereby facilitating a selection by a user of one of the one or more selectable triggers. In some examples, presentation facility 402 may be additionally or alternatively configured to present one or more selectable triggers to a user within a listing of virtual channels, within a program guide, within a menu, and/or in any other suitable manner.

Enhanced content access facility 404 may be configured to allow a user to access enhanced content by way of one or more virtual channels. For example, enhanced content access facility 404 may be configured to receive an input from a user representing a selection of a selectable trigger associated with the virtual channel. In response to the selection by the user of the selectable trigger, enhanced content access facility 404 may provide the user with access to enhanced content by way of the virtual channel.

Storage facility 406 may be configured to maintain data associated with presentation facility 402 and/or enhanced content access facility 404. It will be recognized that storage facility 406 may maintain additional or alternative data as may serve a particular implementation.

Figure 5:
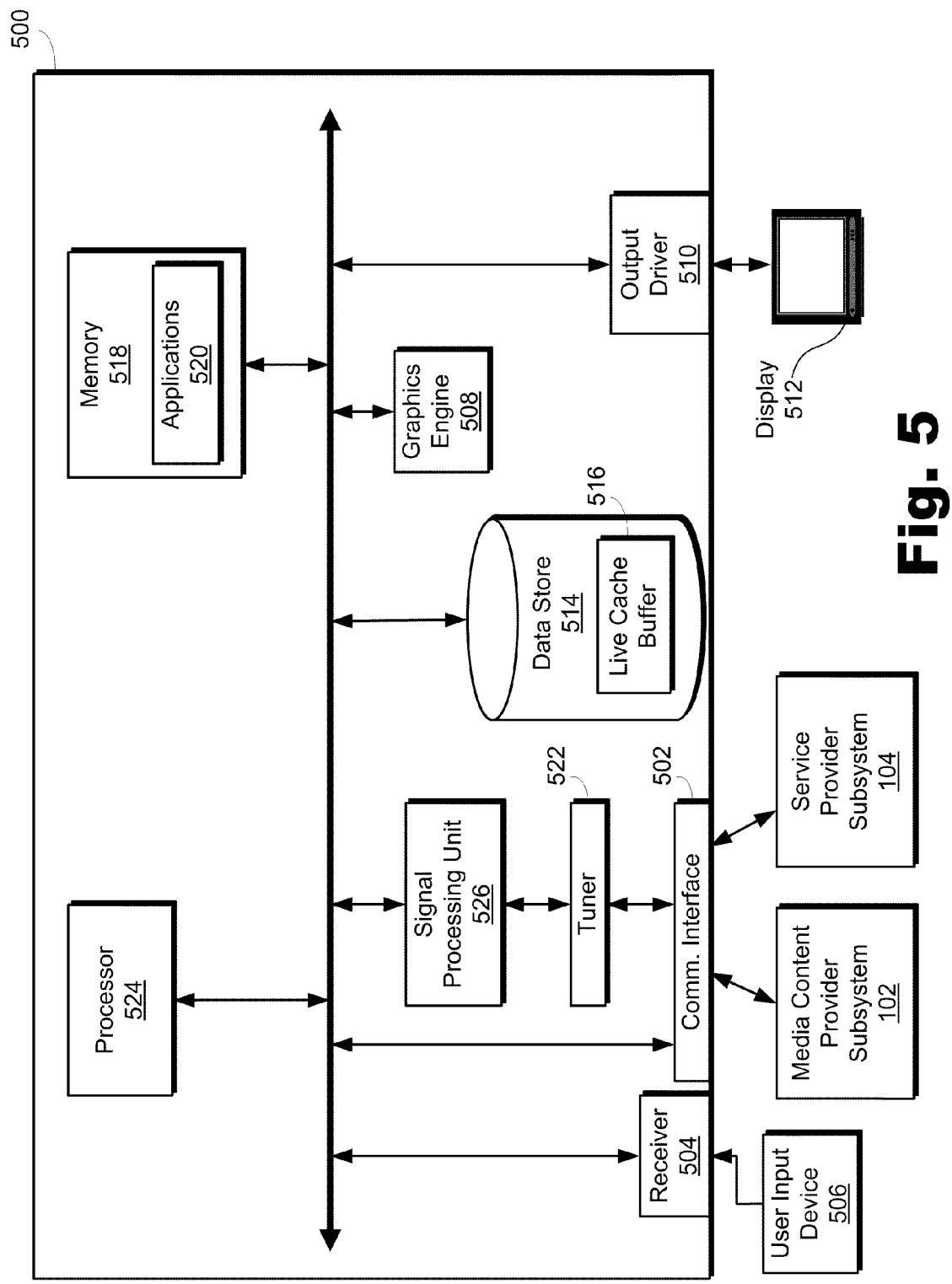
FIG. 5 illustrates an exemplary media content access device according to principles described herein.

Access subsystem 106 and/or components of access subsystem 106 may be implemented as may suit a particular application. FIG. 5 illustrates an exemplary media content access device 500 (or simply "access device 500") having access subsystem 106 implemented thereon. Access device 500 may include one or more of the components of access subsystem 106 shown in FIG. 4 and may be configured to perform one or more of the processes and/or operations described herein. Access device 500 may include, but is not limited to, a set-top box device, a media content processing device, a communications device, a mobile device (e.g., a mobile phone device), a handheld device, a personal computer, a phone device, a personal-digital assistant device, a gaming device, a digital video recording ("DVR") device, a television device, and/or any device configured to perform one or more of the processes and/or operations described herein.

As shown in FIG. 5, access device 500 may include a communication interface 502 configured to receive media content (e.g., advertisements, media content instances, etc.), enhanced content (e.g., by way of one or more virtual channels), and/or other data (e.g., metadata, program guide data, etc.) in any acceptable format from media content provider subsystem 102, service provider subsystem 104, and/or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Access device 500 may also include a receiver 504 configured to receive user input signals from a user input device 506. User input device 506 may include, for example, a remote control device or any other suitable input device (e.g., a keyboard, a mouse, a touch screen, etc.) and may be configured to communicate with receiver 504 via a wireless link, electrical connection, or any other suitable communication link.

Figure 6:
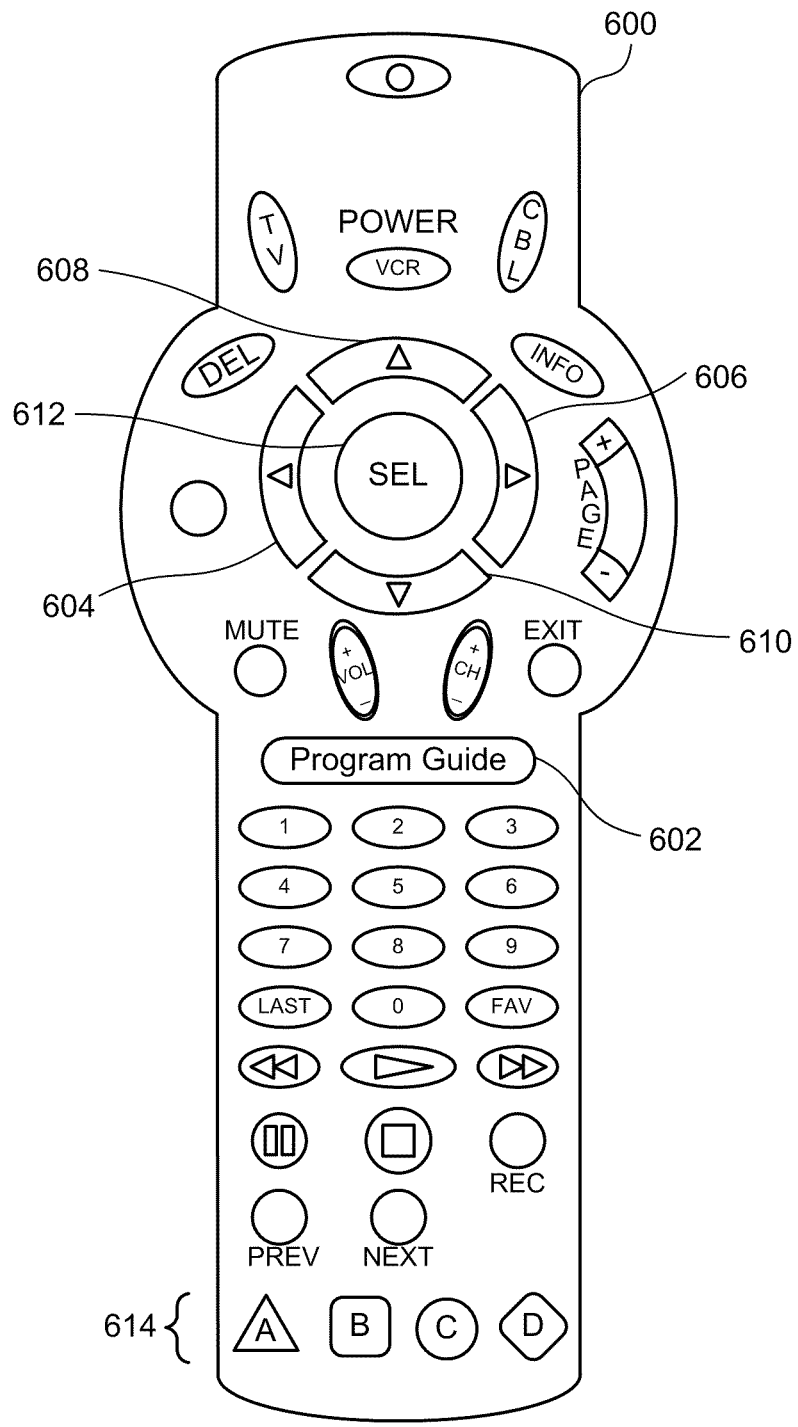
FIG. 6 illustrates an exemplary remote control device according to principles described herein.

FIG. 6 illustrates an exemplary remote control device 600 that may implement user input device 506. In some examples, remote control device 600 may be configured to facilitate a user controlling operations of access subsystem 106. For instance, a program guide button 602 may be configured to evoke a presentation of a program guide GUI on a display. A left button 604, a right button 606, an up button 608, a down button 610, and a select button 612 may be included and configured to facilitate a user evoking and/or navigating through various views, options, and GUIs displayed by a display. A plurality of function buttons 614 (e.g., buttons labeled "A", "B", "C", and "D") may be configured to allow a user to access one or more special services (e.g., virtual channels, widgets, interactive menus, etc.). Remote control device 600 is merely illustrative of one of the many different types of user input devices that may be used to provide input commands to access subsystem 106.

Returning to FIG. 5, access device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content, enhanced content, program guide media content, etc.) generated by graphics engine 508 and to be presented by display 512 for experiencing by a user. For example, output driver 510 may provide data representative of a graphical user interface ("GUI") including a program guide (e.g., an interactive media guide ("IMG")) view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within access device 500 in FIG. 5 for illustrative purposes only. It will be understood that data store 514 may additionally or alternatively be located external to access device 500.

Data store 514 may include one or more live cache buffers 516. Live cache buffer 516 may additionally or alternatively reside in memory 518 or in a storage device external to access device 500. In some examples, media content data may be temporarily stored in live cache buffer 516 to facilitate viewing and/or recording of the media content.

Access device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 520 configured to run on or otherwise be executed by access device 500 may reside in memory 518.

Access device 500 may include one or more tuners 522. Tuner 522 may be configured to selectively receive media content carried on a particular media content carrier channel such that the media content may be processed by access device 500. In some examples, media content received by tuner 522 may be temporarily buffered, or stored, in the live cache buffer 516. If there are multiple tuners 522, there may be a live cache buffer 516 corresponding to each of the tuners 522.

While tuner 522 may be used to receive certain media content-carrying signals transmitted by media content provider subsystem 102 and/or service provider subsystem 104, access device 500 may be configured to receive other types of media content signals (including media content signals and/or program guide data signals) from media content provider subsystem 102, service provider subsystem 104, and/or one or more other sources without using a tuner. For example, media content provider subsystem 102 and/or service provider subsystem 104 may transmit digital streams of data packets (e.g., Internet Protocol ("IP") based data packets) that can be received by way of one or more virtual channels without using a tuner. For such types of media content signals, communication interface 502 may receive and forward the signals directly to other components of access device 500 (e.g., processor 524 or signal processing unit 526, described in more detail below) without the signals going through tuner 522. For an IP-based signal, for example, signal processing unit 526 may function as an IP receiver.

Access device 500 may include at least one processor, such as processor 524, configured to control and/or perform one or more operations of access device 500. Access device 500 may also include a signal processing unit 526 configured to process incoming media content. Signal processing unit 526 may be configured, for example, to demodulate and parse encoded digital media content. In some examples, access device 500 may include one or more signal processing units 526 corresponding to each of the tuners 522.

In some examples, media content provider subsystem 102 and/or service provider subsystem 104 may be configured to support communication with access subsystem 106 via multiple network platforms. For example, a user may utilize multiple access devices 500, each associated with a different network platform, to access one or more applications and/or media content residing within media content provider subsystem 102 and/or service provider subsystem 104.

Figure 7:
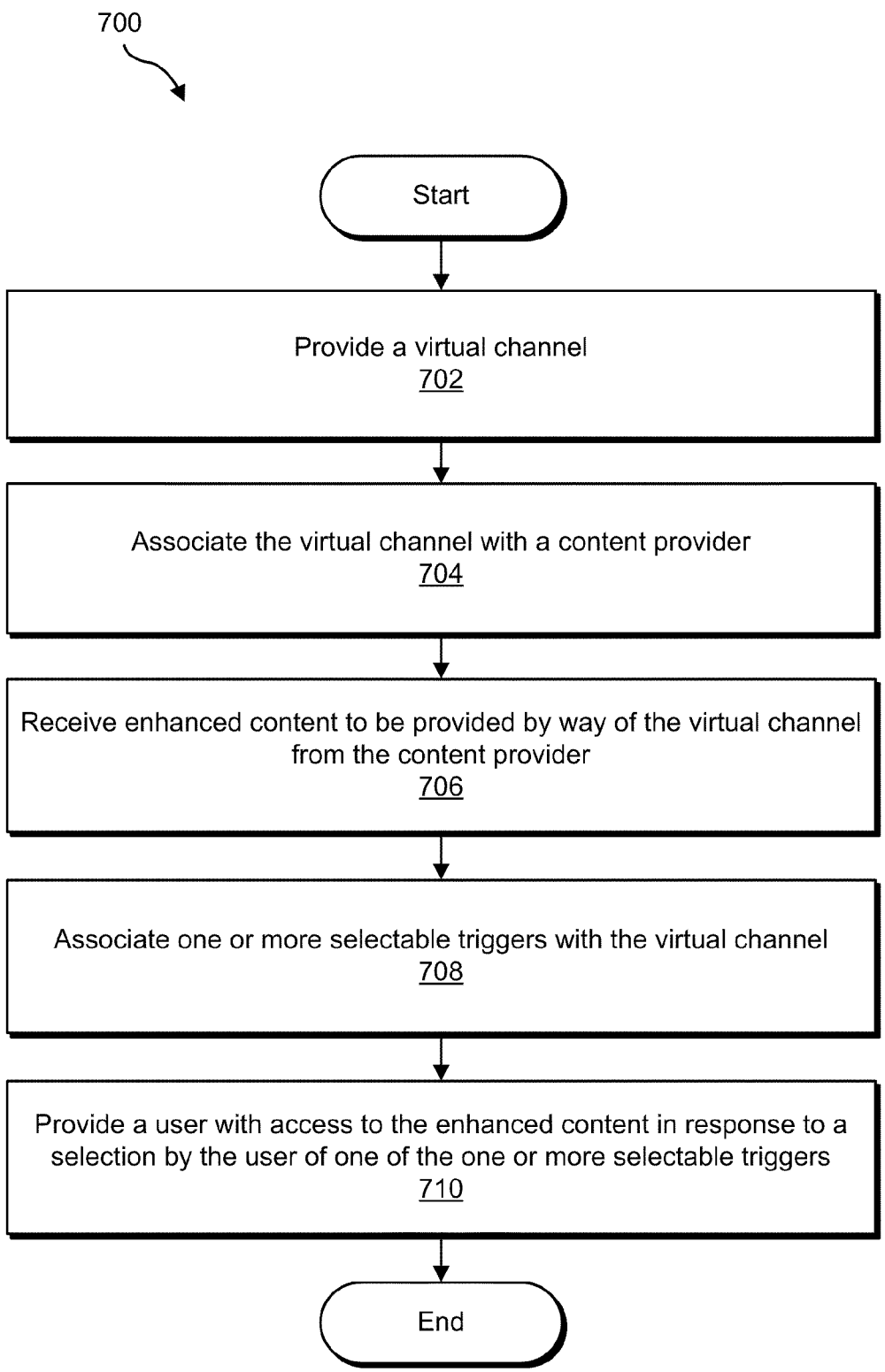
FIG. 7 illustrates an exemplary method of providing enhanced content by way of a virtual channel according to principles described herein.

FIG. 7 illustrates an exemplary method 700 of providing enhanced content by way of a virtual channel. While FIG. 7 illustrates exemplary steps according to one embodiment, other embodiments may omit, add to, reorder, and/or modify any of the steps shown in FIG. 7. One or more steps of method 700 may be performed by service provider subsystem 104.

In step 702, a virtual channel is provided. The virtual channel may be provided by service provider subsystem 104 in any suitable manner. For example, service provider subsystem 104 may provide the virtual channel by creating, initiating, allocating, activating, programming, providing, and/or otherwise managing the virtual channel.

In certain examples, the virtual channel may be associated with a channel code (e.g., a channel number). The channel code may comprise any combination of numbers, letters, and/or symbols. The channel code may be utilized by users to access the virtual channel using access subsystem 106. In some examples, the channel code may comprise a combination of a function key and one or more numbers (e.g., a combination of function key "C" and the number sequence "505") inputted by way of remote control device 600.

In step 704, the virtual channel may be associated with a content provider. Service provider subsystem 104 may associate the virtual channel with a content provider (e.g., a vendor) in any suitable manner.

To illustrate, the virtual channel may be associated with a vendor desiring to utilize the virtual channel to generate interest in a product being promoted by the vendor. The vendor may enter into a lease agreement with service provider personnel associated with service provider subsystem 104 in which the vendor agrees to lease the virtual channel for a specified time period and a specified price. The virtual channel may then be used by the vendor to present enhanced content associated with the promoted product to one or more users during the specified time period.

As another example, a television network (e.g., NBC) may lease a virtual channel to generate user interest in the network. For example, the television network may desire to utilize the virtual channel to promote current or upcoming television programs. Access to the virtual channel may be provided to a user of access subsystem 106 such that the user may experience any enhanced content (e.g., television program clips, advertisements, trailers) that the television network decides to provide by way of the virtual channel, thereby generating user interest in the network. In some examples, the channel code associated with the virtual channel may correspond to the channel code associated with the network (e.g., if the network's services are broadcast over channel number 203, the virtual channel code may be C203). In additional or alternative examples, the virtual channel may be associated with the content provider in any other suitable manner.

In step 706, enhanced content to be provided by way of the virtual channel may be received from the content provider. The enhanced content may be received by service provider subsystem 104 in any of the ways described herein.

In step 708, one or more selectable triggers may be associated with the virtual channel. Service provider subsystem 104 may associate the one or more selectable triggers with the virtual channel in any suitable manner.

As mentioned, the one or more selectable triggers may be configured to provide a user with access to the associated virtual channel. To this end, the one or more selectable triggers may include channel codes, links, menu options, selectable graphical objects, and/or any other suitable trigger. The selectable triggers may be provided by way of one or more advertisements, options, listings, program guides, menus, and/or any other suitable manner for delivering and/or displaying selectable triggers.

Figure 8:
FIG. 8 illustrates an exemplary advertisement frame that may be included within a visual advertisement presented to a user according to principles described herein.

To illustrate, a selectable trigger may be included in an advertisement presented to a user. The advertisement may be included, for example, within a broadcast advertisement stream that is presented to the user by way of access subsystem 106. For example, FIG. 8 shows an exemplary advertisement frame that may be included within a visual advertisement presented to a user of access subsystem 106. As shown in FIG. 8, advertisement frame 800 may be configured to promote a movie entitled "Tarzan". As shown in advertisement frame 800, the movie is about to be released in theaters.

Advertisement frame 800 may be further configured to display a selectable trigger 802 that directs a viewer of advertisement frame 802 to press a sequence of input buttons on a remote control device or the like in order to access a virtual channel associated with the movie. In some examples, selectable trigger 802 may be specific to a particular subscriber television network (e.g., the Verizon® FIOS® network) such that only users of the particular subscriber television network may access the virtual channel by pressing the displayed sequence of input buttons. It will be recognized that selectable trigger 802 may be applicable to a user of any subscriber network.

In some alternative examples, selectable trigger 802 may include a hyperlink or other trigger that may be selected by a user in order to access enhanced content associated with the movie. Selection of the hyperlink may direct the user to an interactive portal provided by way of a virtual channel by which the user may access enhanced content associated with the movie. In some examples, the hyperlink or other enhanced content trigger may be transmitted to access subsystem 106 independent of the broadcast advertisement stream. For example, the hyperlink or other enhanced content trigger may be transmitted by way of an IP network or the like.

Figure 9:
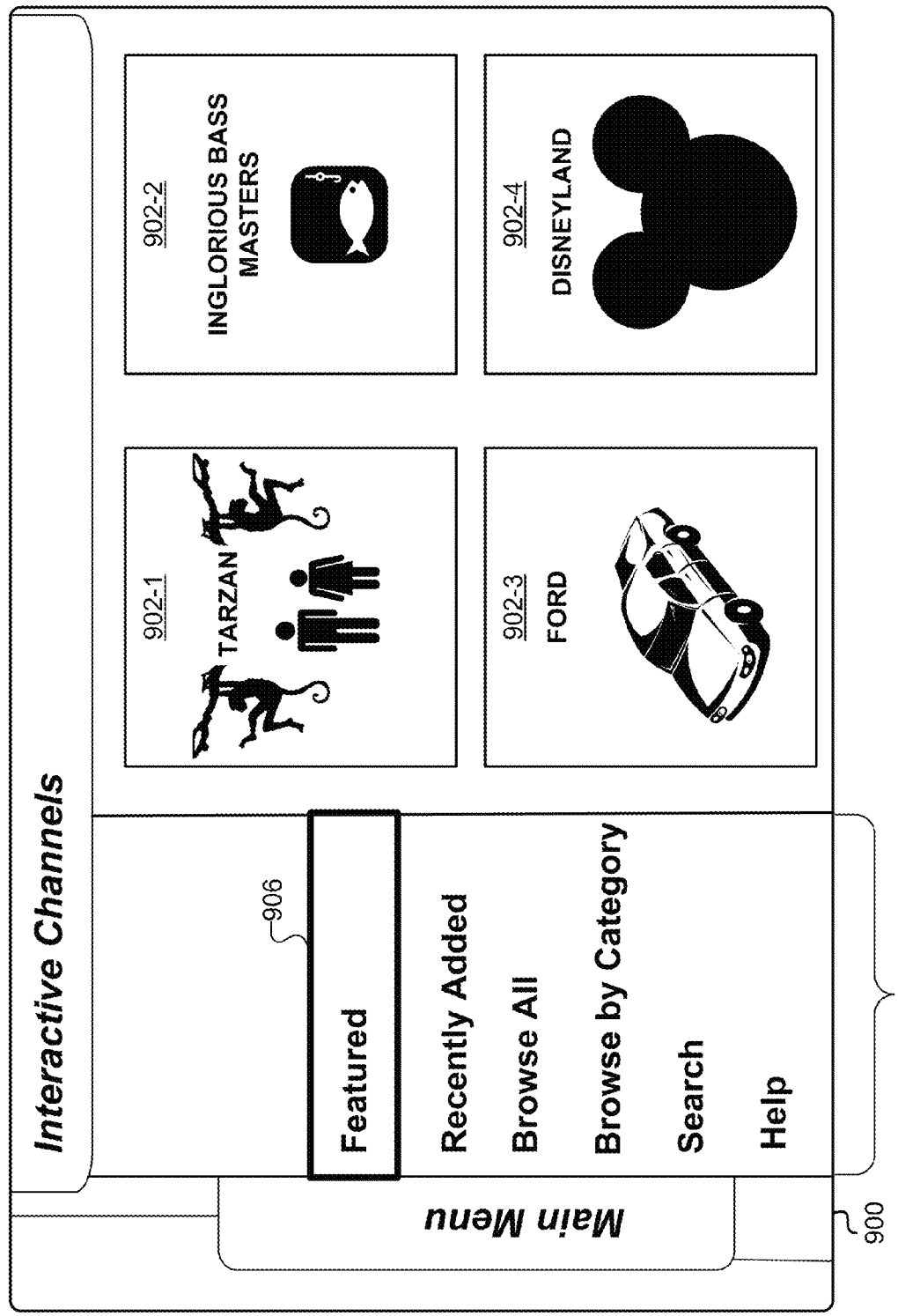
FIG. 9 illustrates an exemplary form of presenting one or more selectable triggers according to principles described herein.

FIG. 9 illustrates an alternative form of presenting one or more selectable triggers configured to facilitate access to one or more virtual channels associated with one or more promoted products. As shown in FIG. 9, a GUI 900 including a display of a plurality of selectable triggers 902-1 through 902-4 (collectively referred to herein as "selectable triggers 902") may be presented to a user of access subsystem 106. Selectable triggers 902 may include selectable graphical objects, as shown in FIG. 9, and may be presented within an interactive program guide, an interactive menu hierarchy, and/or any other type of GUI as may serve a particular application. GUI 900 may be displayed on a display device (e.g., a television) associated with access subsystem 106.

As shown, GUI 900 may include an interactive menu configured to facilitate navigation between and/or selection of selectable triggers 902. Each selectable trigger 902 may be associated with a product being promoted by a vendor. For example, selectable trigger 902-1 may be associated with a movie entitled "Tarzan", selectable trigger 902-2 may be associated with a movie entitled "Inglorious Bass Masters", selectable trigger 902-3 may be associated with an automobile (e.g., provided by Ford), and selectable trigger 902-4 may be associated with a theme park (e.g., Disneyland). Although GUI 900 includes four selectable triggers 902, it will be recognized that any number of selectable triggers may be included in GUI 900 as may serve a particular implementation.

In some examples, selectable triggers 902 may be grouped into categories to facilitate intuitive browsing thereof by a user. For example, FIG. 9 shows that a listing 904 of groups of selectable triggers 902 may be included in GUI 900. The groups may allow a user to browse through selectable triggers 902 based on featured virtual channels, all virtual channels, and/or categorized virtual channels. A user may utilize a selection box 906 to navigate through various entries in list 904 and/or select a particular selectable trigger 902. For example, a user may position selection box 906 over a desired selectable trigger 902, after which the user may press a "select" button or the like on a remote control device to access the corresponding virtual channel. To illustrate, a user may access a virtual channel associated with "Tarzan" by positioning selection box 906 over selectable trigger 902-1 and pressing a "select" button on a remote control device.

Figure 10:
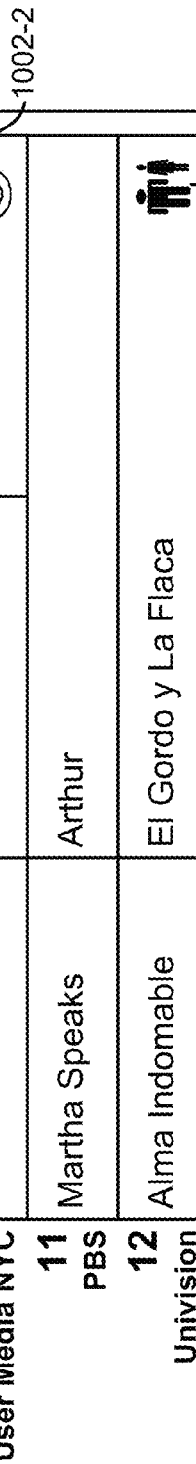
FIG. 10 Illustrates another exemplary form of presenting one or more selectable triggers according to principles described herein.

FIG. 10 illustrates another alternative form of presenting one or more selectable triggers configured to facilitate access to one or more virtual channels associated with one or more promoted products. As shown in FIG. 10, a GUI 1000 representative of an interactive program guide may be provided for presentation to a user. Selectable triggers 1002-1 through 1002-3 (collectively referred to herein as "selectable triggers 1002") may be displayed within the interactive program guide in the form of selectable graphical objects. Each selectable trigger 1002 may be associated with a particular program listed in the interactive program guide. To access enhanced content associated with a particular program (e.g., "Babar"), a corresponding selectable trigger (e.g., selectable trigger 1002-1) may be selected by the user.

Although GUI 1000 includes three selectable triggers 1002, it will be recognized that, in additional or alternative embodiments, GUI 1000 may include any number of selectable triggers 1002 suitable for a particular implementation. In some examples, multiple selectable triggers 1002 may be associated with a single program.

The foregoing examples of selectable triggers associated with a virtual channel are merely illustrative of the many different types of selectable triggers that may be provided to a user. Other types of selectable triggers, such as links and/or triggers available through banner advertisements, pop-up messages, and the like, may be presented to the user as may serve a particular implementation.

Returning to FIG. 7, in step 710, in response to a selection by the user of one of the one or more selectable triggers provided in step 708, the user may be provided with access to the enhanced content received in step 706. The user may be provided with access to the enhanced content in any suitable manner as may serve a particular application.

Figure 12:
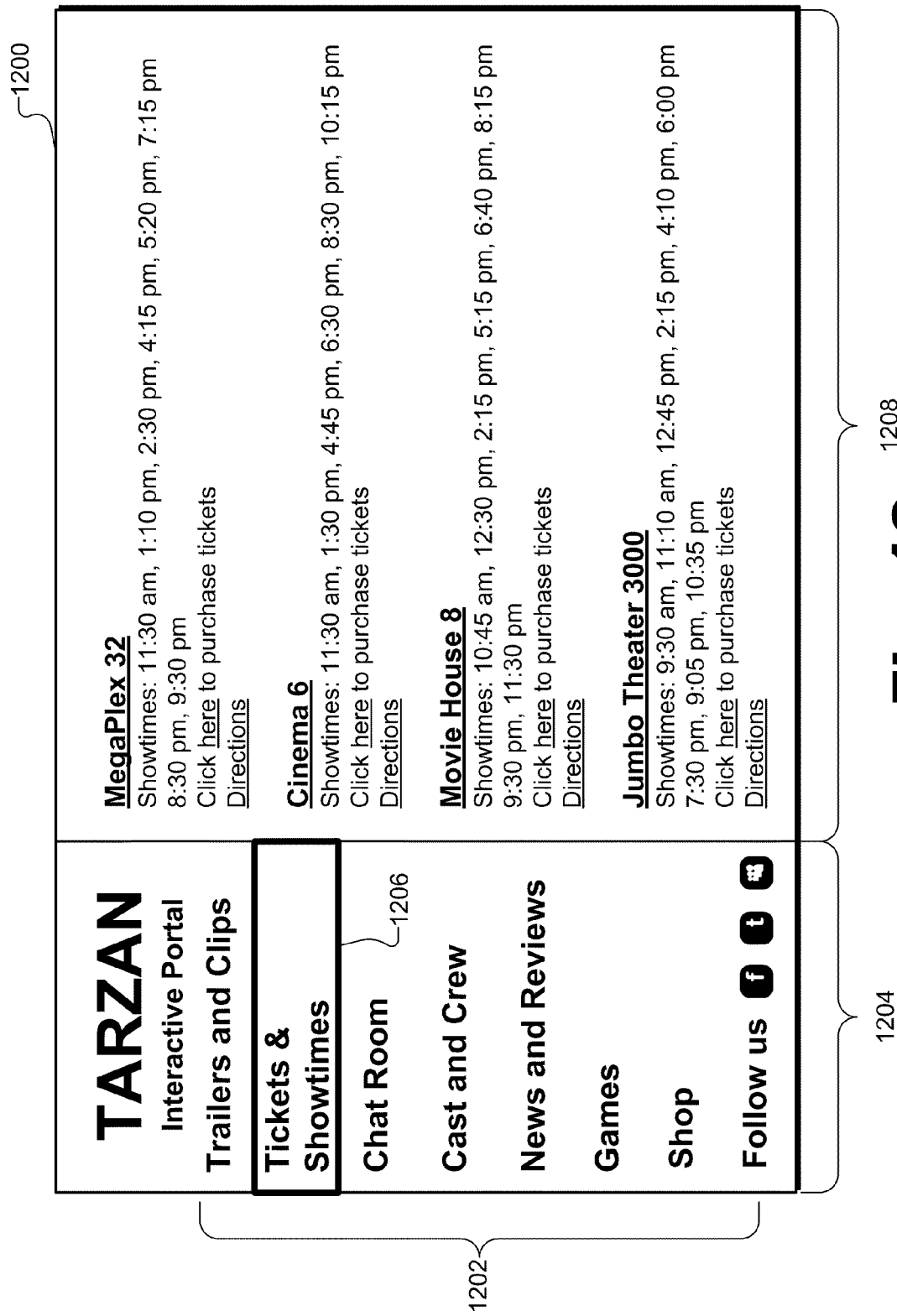
FIG. 12 illustrates another exemplary interactive portal according to principles described herein.
Figure 13:
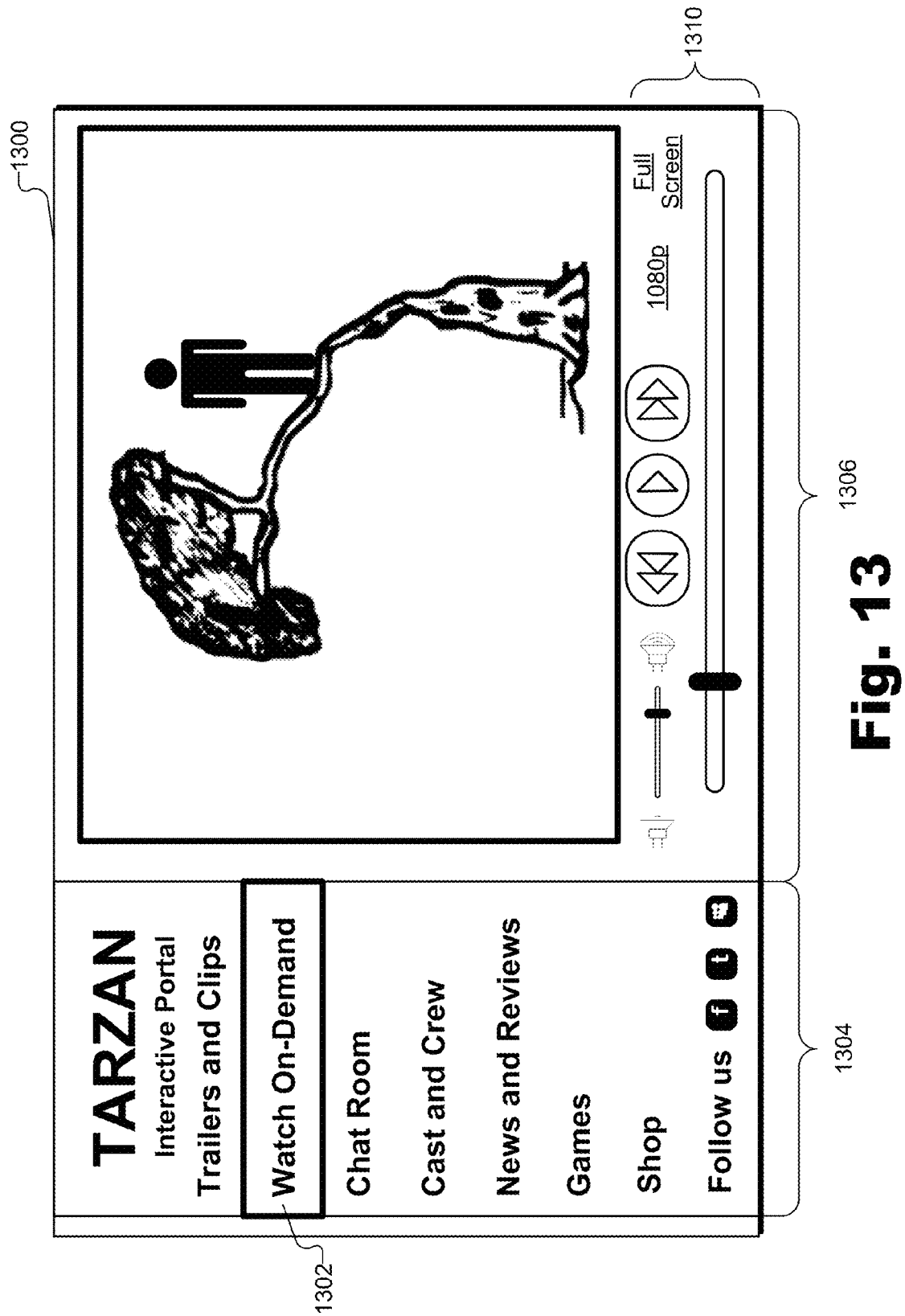
FIG. 13 illustrates another exemplary interactive portal according to principles described herein.

To illustrate, FIGS. 11-13 show exemplary interactive portals 1100, 1200, and 1300 each providing the user with access to enhanced content associated with the movie "Tarzan" that may be presented to the user in response to a selection by the user of selectable trigger 902-1 shown in FIG. 9. Each interactive portal 1100, 1200, and 1300 may correspond to a different time period of a marketing campaign for the movie "Tarzan". For example, interactive portal 1100 may be configured to generate user interest prior to the release of the movie, interactive portal 1200 may be configured to generate user interest in, as well as facilitate purchase of tickets for, the movie once the movie is available in theaters, and interactive portal 1300 may be configured to generate user interest in, and facilitate a user's purchase of, the movie once the movie is released on DVD and/or pay-per-view. It will be recognized that interactive portals 1100, 1200, and 1300 shown in FIGS. 11-13 are merely illustrative of the many different interactive portals and/or other virtual channels by which enhanced content associated with a virtual channel may be presented to the user.

As shown in FIG. 11, interactive portal 1100 may be configured to present various types of enhanced content associated with the movie "Tarzan". For example, the enhanced content may be organized within a plurality of selectable enhanced content categories 1102, a list of which may be displayed within a viewing pane (e.g., viewing pane 1104) of interactive portal 1100. As shown in FIG. 11, exemplary enhanced content categories 1102 may include, but are not limited to, trailers and clips, related movies, social networking content (e.g., chat rooms, links to social networking sites), cast and crew content, content configured to facilitate purchase by the user of the product or related products, and/or options to send content to a friend (e.g., via email).

To access enhanced content included within one of the enhanced content categories 1102, a user may position a selection box 1106 over the desired category. In response, enhanced content included within the selected category may be presented within another viewing pane (e.g., viewing pane 1108). For example, as shown in FIG. 11, selection box 1106 may be positioned over an enhanced content category labeled "chat room". Hence, an interactive chat room is displayed within viewing pane 1108. The user may utilize the interactive chat room to discuss "Tarzan" with other fans of the movie, receive recommendations from other users, access user generated content, arrange to meet other fans of "Tarzan" in person, and/or otherwise interact socially with other users who are interested in the "Tarzan" movie.

Additional or alternative enhanced content categories 1102 may be displayed within interactive portal 1100 as may serve a particular application. For example, a user and/or a vendor may specify which enhanced content categories are displayed within interactive portal 1100. In some examples, the enhanced content categories 1102 may change over time, as specified by the vendor and/or user.

Interactive portal 1200 shown in FIG. 12 may include additional or alternative enhanced content associated with the movie "Tarzan" and may be presented to a user during a time period in which the movie is available in theaters. The enhanced content included in interactive portal 1200 may be organized within enhanced content categories 1202 listed in viewing pane 1204. Exemplary enhanced content categories 1202 may include, but are not limited to, trailers and clips, information regarding tickets and showtimes including links to purchase tickets and/or obtain directions to theaters, a chat room, casting crew content, news and reviews (e.g., user and critic ratings of the movie), activities or games associated with the movie (e.g., trivia games, puzzles, and/or any other interactive activity associated with movie), and/or content configured to facilitate a user's purchase of products related to the movie.

To access enhanced content included within one of the enhanced content categories 1202, a user may position a selection box 1206 over the desired category. In response, enhanced content included within the selected category may be presented within another viewing pane (e.g., viewing pane 1208). For example, as shown in FIG. 12, selection box 1206 is positioned over an enhanced content category labeled "Tickets & Showtimes". Hence, a listing of information including theaters showing the movie, showtimes, links to purchase tickets, and/or links to obtain directions to the theaters may be displayed within viewing pane 1208. A user may utilize the enhanced content to determine where and when to watch the movie, to purchase tickets for the movie, and/or to obtain directions to the desired theater.

Interactive portal 1300 shown in FIG. 13 may include additional or alternative enhanced content associated with the movie "Tarzan" and may be presented to a user once the movie is released on DVD and or pay-per-view. For example, interactive portal 1300 may include the same enhanced content as interactive portal 1200 as well as a "watch on-demand" option 1302. Option 1302 may be positioned in viewing pane 1304, for example, and may be selected by a user to view the movie in viewing pane 1306. Interactive portal 1300 may also include media content controls 1310 configured to allow a user to navigate through and control the display of the movie (e.g., fast forward through the movie, change resolutions of the movie, etc.).

In some examples, system 100 may be configured to provide access to enhanced content associated with a purchased media content instance (e.g., a purchased pay-per-view movie) concurrently with a presentation of the media content instance by access subsystem 106. For example, a user may select the "Games" category shown in FIG. 13 to participate in an interactive game associated with "Tarzan" while the movie is being presented to the user. In response, the interactive game may be displayed within viewing pane 1304 or an additional viewing pane while "Tarzan" is presented in viewing pane 1306. In some examples, a user participating in a game may desire to invite one or more additional users to participate in (e.g., join) the interactive game. To this end, the user may select one or more friends or other users who have purchased access to "Tarzan" to invite to participate in the interactive game.

Although interactive portals 1100, 1200, and 1300 are configured to generate user interest in a movie, principles described herein may be utilized to promote and/or generate user interest in any other product as may serve a particular application.

Figure 14:
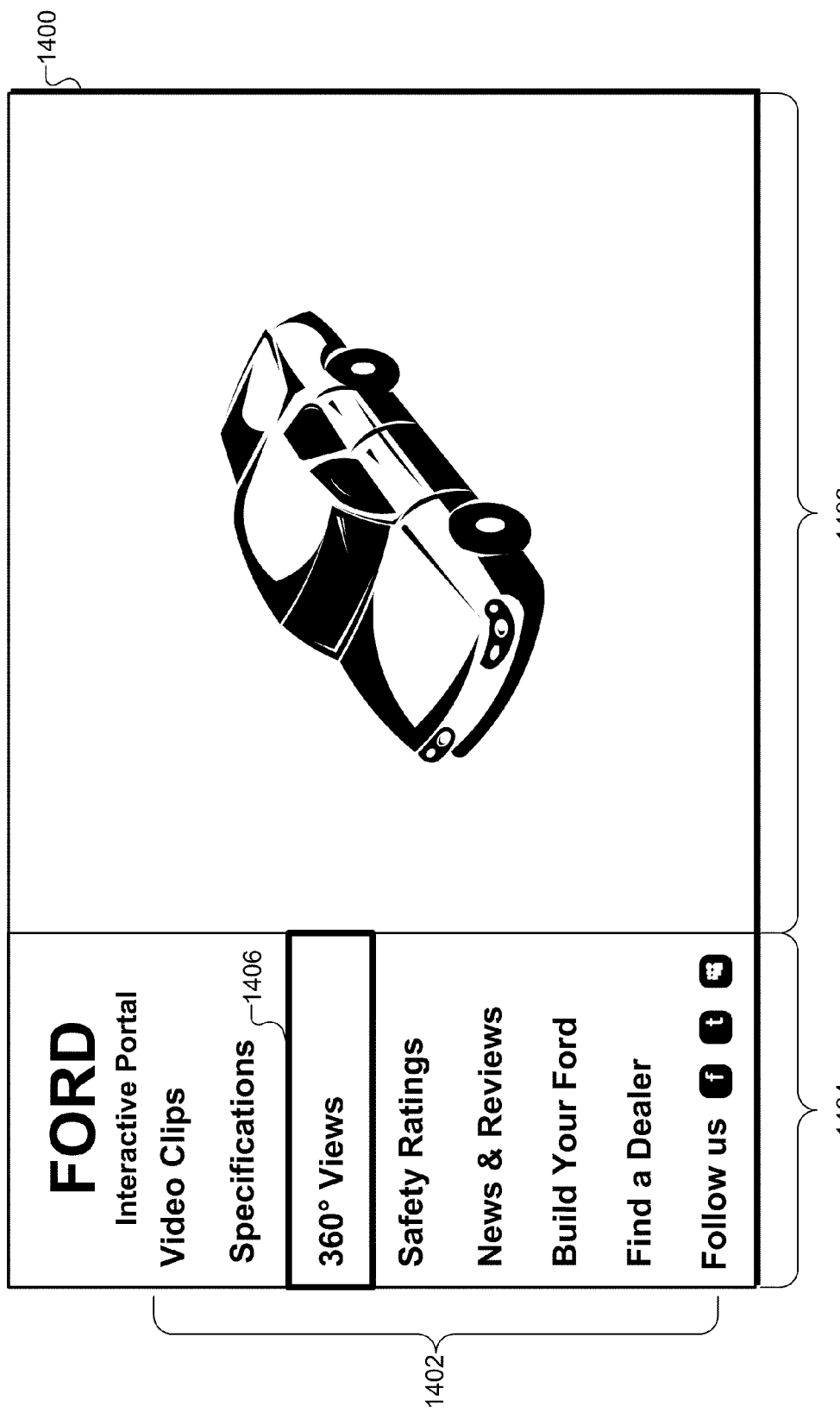
FIG. 14 illustrates another exemplary interactive portal according to principles described herein.

For example, FIG. 14 illustrates an exemplary interactive portal 1400 that may be presented to a user and that is configured to generate user interest in an automobile (e.g., an automobile offered by Ford). A user may be directed to interactive portal 1400 upon selecting a corresponding selectable trigger (e.g., as instructed in a broadcast advertisement advertising the automobile). Interactive portal 1400 may be configured to present various types of enhanced content associated with the promoted product. The enhanced content may be organized into enhanced content categories 1402 and displayed within viewing pane 1404. As shown in FIG. 14, exemplary enhanced content categories 1402 may include video clips of the promoted product, specifications of the promoted product, images of the promoted product (e.g., 360° views of the promoted product), ratings (e.g., safety ratings) of the promoted product, news and reviews (e.g., critic reviews, user reviews, etc.) related to the promoted product, content configured to allow a user to personally configure and/or purchase the promoted product, content configured to direct the user to a retailer (e.g., dealer) of the promoted product, and/or social networking content (e.g., chat rooms, links to social networking sites).

A user may utilize a selection box 1406 to select one of the enhanced content categories 1402 to be accessed and/or displayed through another viewing pane (e.g., viewing pane 1408). To illustrate, a user may position selection box 1406 over the enhanced content category labeled "360° Views" to view images (e.g., three dimensional images) of the automobile. The user may then view and interact with the images in viewing pane 1408 to determine whether the user is interested in purchasing the automobile. If so, the user may select the enhanced content category labeled "Build Your Ford" to customize the automobile to his/her liking and/or select the enhanced content category labeled "Find a Dealer" to be directed to a dealer where the user can purchase the automobile.

Figure 15:
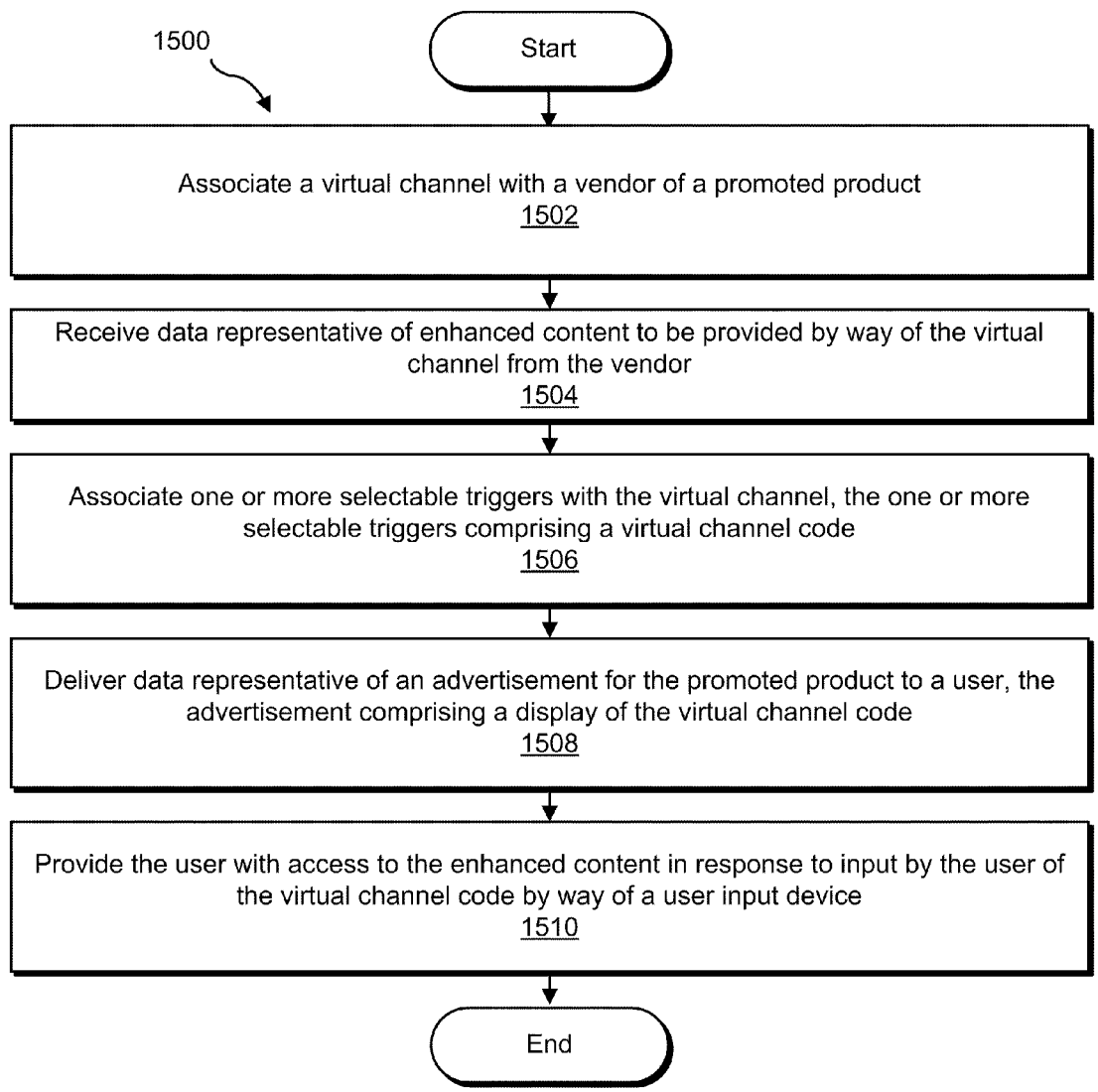
FIG. 15 illustrates another exemplary method of providing enhanced content by way of a virtual channel according to principles described herein.

FIG. 15 illustrates another exemplary method 1500 of providing enhanced content by way of a virtual channel. While FIG. 15 illustrates exemplary steps according to one embodiment, other embodiments may omit, add to, reorder, and/or modify any of the steps shown in FIG. 15. One or more steps of method 1500 may be performed by service provider subsystem 104.

In step 1502, a virtual channel may be associated with a vendor of a promoted product. The virtual channel may be associated with the vendor in any of the ways described herein.

In step 1504, data representative of enhanced content to be provided by way of the virtual channel is received from the vendor. The data representative of the enhanced content may be received in any of the ways described herein.

In step 1506, one or more selectable triggers are associated with the virtual channel, the one or more selectable triggers comprising a virtual channel code. The one or more selectable triggers may be associated with the virtual channel in any of the ways described herein.

In step 1508, data representative of an advertisement for the promoted product is delivered to a user, the advertisement comprising a display of the virtual channel code. The advertisement may be delivered to the user in any of the ways described herein.

In step 1510, the user may be provided with access to the enhanced content in response to input by the user of the virtual channel code by way of a user input device. Access to the enhanced content may be provided to the user in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a computer-readable medium, or combinations of tangibly embodied computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
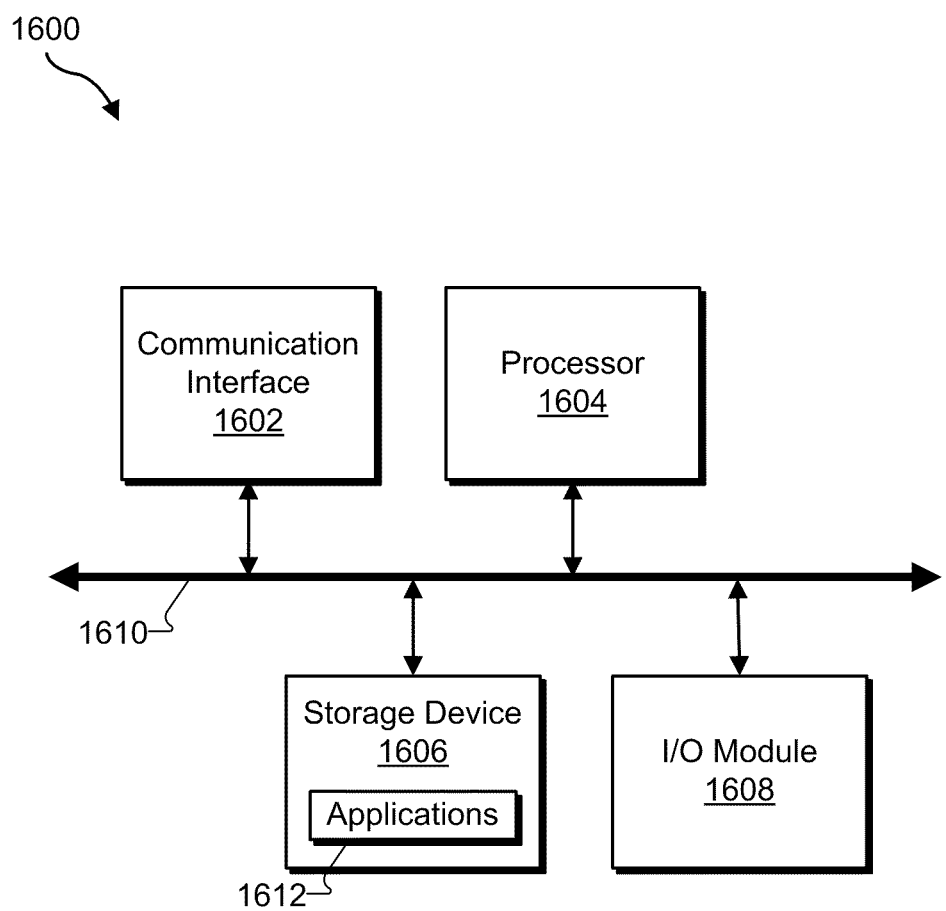
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, and any other suitable interface. In at least one embodiment, communication interface 1602 may provide a direct connection between content provider subsystem 102, service provider subsystem 104, and/or access subsystem 106 via a direct link to a network, such as network 108 of FIG. 1. Communication interface 1602 may additionally or alternatively provide such a connection through, for example, a local area network (such as an Ethernet network), a personal area network, a telephone or cable network, a satellite data connection, a dedicated URL, or any other suitable connection. Communication interface 1602 may be configured to interface with any suitable communication media, protocols, and formats, including any of those mentioned above.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications described herein) configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with media content facility 202, enhanced content generation facility 204, virtual channel management facility 302, enhanced content management facility 304, presentation facility 402, and/or enhanced content access facility 404. Likewise, storage facility 206, storage facility 306, and/or storage facility 406 may be implemented by or within storage device 1606.

The components of system 100 may be implemented by computing device 1600 or a combination of computing devices, such as a media content processing device, a server device (e.g., an application server, video server, web server, etc.), office equipment, a set-top box, a communications device, a mobile device (e.g., a mobile phone device), a hand-held device, a personal computer, a phone device, a personal-digital assistant device, a gaming device, a digital video recording ("DVR") device (e.g., a personal video recording ("PVR") device), a television device, and/or any media content access and/or distribution device configured to perform one or more of the advertising platform processes and/or operations described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a service provider subsystem, a virtual channel used to promote a product associated with a media content instance, the promoted product comprising a movie available in one or more theaters;
associating, by the service provider subsystem, the virtual channel with a content provider configured to provide the media content instance;
receiving, by the service provider subsystem, enhanced content associated with the promoted product and to be provided by way of the virtual channel from the content provider, the enhanced content comprising:
a link to purchase one or more tickets to the movie available in the one or more theaters;
one or more showtimes for the movie at the one or more theaters; and
a link to directions to the one or more theaters;
associating, by the service provider subsystem, one or more selectable triggers with the virtual channel, the one or more selectable triggers displayed with a listing of the media content instance included within an interactive program guide presented to a user; and
providing, by the service provider subsystem, the user with access to the enhanced content associated with the promoted product by way of an interactive portal associated with the virtual channel in response to a selection by the user of one of the one or more selectable triggers displayed with the listing of the media content instance included within the interactive program guide presented to the user, the interactive portal facilitating interaction by the user with the enhanced content associated with the promoted product and comprising:
a viewing pane that lists enhanced content categories that each include a different portion of the enhanced content associated with the promoted product, and
another viewing pane that presents a particular portion of the enhanced content included in an enhanced content category selected by the user from the enhanced content categories listed in the viewing pane.

2. The method of claim 1, further comprising:
providing, by the service provider subsystem, one or more application programming interfaces configured to facilitate customization of the interactive portal by the content provider; and
customizing, by the service provider subsystem, the interactive portal in accordance with input provided by the content provider.

3. The method of claim 1, wherein the interactive portal comprises a layout consistent with a plurality of other interactive portals associated with other virtual channels.

4. The method of claim 1, wherein the interactive program guide presented to a user includes at least one of a broadcast advertisement stream presented to the user, a menu presented to the user, a banner advertisement presented to the user, and a pop-up message presented to the user.

5. The method of claim 1, wherein the one or more selectable triggers comprise at least one of a channel code, a link, a listing within a menu, and a selectable graphical object.

6. The method of claim 1, further comprising dynamically updating, by the service provider subsystem, the enhanced content based on an interaction of the user with the enhanced content.

7. The method of claim 1, wherein the virtual channel is accessible over a subscriber television network.

8. The method of claim 1, wherein the enhanced content further comprises at least one of social networking content associated with a promoted product, Internet-based content associated with the promoted product, content associated with personnel associated with the promoted product, rating content associated with the promoted product, one or more games associated with the promoted product, and one or more advertisements associated with the promoted product.

9. The method of claim 8, wherein the enhanced content further comprises at least one of one or more scenes included within the movie, production content associated with the movie, one or more scenes deleted from the movie, one or more alternative scenes associated with the movie, and one or more platform-specific formats of the movie.

10. The method of claim 1, wherein the virtual channel is associated with the content provider for a predetermined period of time.

11. The method of claim 10, further comprising associating, by the service provider subsystem, the virtual channel with another content provider after the predetermined period of time.

12. The method of claim 1, embodied as computer-executable instructions on at least one non-transitory computer-readable medium.

13. The method of claim 1, wherein the one of the one or more selectable triggers comprises an advertisement for the movie displayed within the interactive program guide presented to the user.

14. The method of claim 1, wherein the providing of the user with access to the enhanced content comprises displaying the enhanced content within the interactive program guide presented to the user.

15. A method comprising:
associating, by a service provider subsystem, a virtual channel specific to a particular subscriber television network with a vendor of a promoted product, the promoted product comprising a movie available in one or more theaters;
receiving, by the service provider subsystem, data representative of enhanced content associated with the promoted product to be provided by way of the virtual channel from the vendor, the enhanced content comprising:
a link to purchase one or more tickets to the movie available in the one or more theaters;
one or more showtimes for the movie at the one or more theaters; and
a link to directions to the one or more theaters;
associating, by the service provider subsystem, one or more selectable triggers with the virtual channel specific to the particular subscriber television network, the one or more selectable triggers comprising a virtual channel code;
delivering, by the service provider subsystem over a television network, data representative of an advertisement for the promoted product to a plurality of users, the advertisement including a display of the virtual channel code; and
providing, by the service provider subsystem, one or more of the plurality of users with access to the enhanced content associated with the promoted product by way of an interactive portal associated with the virtual channel in response to input by the one or more of the plurality of users of the virtual channel code by way of a user input device, the interactive portal facilitating interaction by the one or more of the plurality of users with the enhanced content associated with the promoted product and comprising:
a viewing pane that lists enhanced content categories that each include a different portion of the enhanced content associated with the promoted product, and
another viewing pane that presents a particular portion of the enhanced content included in an enhanced content category selected by the user from the enhanced content categories listed in the viewing pane.

16. The method of claim 15, wherein the virtual channel code corresponds to a channel number associated with the television network.

17. A system comprising:
at least one physical computing device that comprises
a virtual channel management facility that associates virtual channel used to promote a product associated with a media content instance with a content provider configured to provide the media content instance, wherein the promoted product comprises a movie available in one or more theaters; and
an enhanced content management facility communicatively coupled to the virtual channel management facility and configured to
receive, from the content provider, enhanced content associated with the promoted product and to be provided by way of the virtual channel, the enhanced content comprising:
a link to purchase one or more tickets to the movie available in the one or more theaters,
one or more showtimes for the movie at the one or more theaters, and
a link to directions to the one or more theaters,
associate one or more selectable triggers with the virtual channel, the one or more selectable triggers displayed with a listing of the media content instance included within an interactive program guide presented to a user, and
provide the user with access to the enhanced content associated with the promoted product by way of an interactive portal associated with the virtual channel in response to a selection by the user of one of the one or more selectable triggers displayed with the listing of the media content instance included within the interactive program guide presented to the user, the interactive portal facilitating interaction by the user with the enhanced content associated with the promoted product and comprising:

a viewing pane that lists enhanced content categories that each include a different portion of the enhanced content associated with the promoted product, and another viewing pane that presents a particular portion of the enhanced content included in an enhanced content category selected by the user from the enhanced content categories listed in the viewing pane.

18. The system of claim 17, wherein the enhanced content management facility is further:

provides one or more application programming interfaces that facilitate customization of the interactive portal by the content provider; and customizes the interactive portal in accordance with input provided by the content provider.

19. The system of claim 17, wherein the one of the one or more selectable triggers comprises an advertisement for the movie displayed within the interactive program guide presented to the user.

* * * * *